United States Patent
Lynch et al.

(10) Patent No.: US 8,189,052 B1
(45) Date of Patent: May 29, 2012

(54) METHOD AND SYSTEM FOR EVALUATING VIDEO PROCESSING TECHNOLOGY

(75) Inventors: John David Lynch, Olathe, KS (US);
Eric Eugene Miller, Olathe, KS (US);
Monika Kishor Panpaliya, Leawood, KS (US); Charles Daniel Todd, Parkville, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 973 days.

(21) Appl. No.: 12/181,787

(22) Filed: Jul. 29, 2008

(51) Int. Cl.
*H04N 17/00* (2006.01)
*H04N 17/02* (2006.01)

(52) U.S. Cl. .................. 348/180; 348/192; 348/193

(58) Field of Classification Search .................. 348/180, 348/192–193
See application file for complete search history.

(56) References Cited

U.S. PATENT DOCUMENTS

| | | | | |
|---|---|---|---|---|
| 7,936,916 | B2 * | 5/2011 | Zhang et al. | 382/156 |
| 2002/0161664 | A1 * | 10/2002 | Shaya et al. | 705/26 |

FOREIGN PATENT DOCUMENTS

| | | |
|---|---|---|
| EP | 1585348 A1 | 12/2005 |
| WO | 2007000065 A1 | 1/2007 |
| WO | 2007071076 A1 | 6/2007 |

OTHER PUBLICATIONS

Richardson et al., "Fast subjective video quality measurement with user feedback", Electronics Letters, Jun. 24, 2004, vol. 40, No. 13, 2 pp.
V-Factor QoE Platform—Symmetricom QoE Assurance Division—http://qoe.symmetricom.com/solutions/vFactor.asp 2 pp.
Perceptual Video Quality (QoE Fact Sheet)—http://qoe.symmetricom.com/solutions/vFactor.asp—1 p.

* cited by examiner

*Primary Examiner* — Pankaj Kumar
*Assistant Examiner* — Charles N Hicks

(57) ABSTRACT

Media, systems, and methods are provided for evaluating a video processing technology based on subjective feedback. Videos from a plurality of sources for one or more subjective feedback targets are randomly selected. The selected videos with a video processing technology are processed, such that the selected videos include at least one impairment. The selected videos are transmitted to the one or more subjective feedback targets. Subjective feedback is received from the one or more subjective feedback targets regarding a perceptional aspect of the selected videos.

19 Claims, 4 Drawing Sheets

METHOD AND SYSTEM FOR EVALUATING VIDEO PROCESSING TECHNOLOGY

BACKGROUND

Traditionally, video processing technologies, such as codecs, are assessed utilizing objective methods. That is, video processing technologies are judged or evaluated for their performance typically by processing a video utilizing the video processing technology with some type of impairment, and then sending the video from the source to the target and measuring quantitatively certain aspects of the video quality. However, such objective methodology seriously lacks any input of perceptional aspects regarding the video quality. That is to say, objective methodology testing does not take into account the way that individuals perceive video quality from their point of view. Furthermore, objective methodology does not address the particular domains of targets. For instance, since objective methodology does not allow for user feedback, the domain of a target is not taken into account within the evaluation of the video processing technology. Thus, a person with hearing impairment would not be able to provide his or her perceptional subjective feedback regarding video processing technology through traditional means and methodology.

On the other hand, subjective methodology is recommended. However, it may be an inefficient process since subjective feedback typically requires multiple users to be viewing different types of videos which have been processed by more than one video processing technology. Also, subjective feedback assessment and testing can require a lot of time and financial resources. Therefore, accuracy and a more efficient approach towards subjective feedback testing would be advantageous particularly when the subjective feedback targets number well into the hundreds or thousands.

SUMMARY

Embodiments of the invention are defined by the claims below, not this summary. A high-level overview of embodiments of the invention are provided here for that reason, to provide an overview of the disclosure.

In a first embodiment, a method is provided for evaluating a video processing technology based on subjective feedback. Videos from a plurality of sources for one or more subjective feedback targets are randomly selected. The selected videos with a video processing technology are processed, such that the selected videos include at least one impairment. The selected videos are transmitted to the one or more subjective feedback targets. Subjective feedback is received from the one or more subjective feedback targets regarding a perceptional aspect of the selected videos.

In a second embodiment, computer-storage media performing a method for assessing a video processing technology based on subjective feedback is provided. A target of a domain is identified, based on a domain attribute. Two or more videos from a plurality of video sources for the target are randomly selected. At least one impairment is selected for the two or more videos. A processing of the two or more videos is controlled, where the processing is accomplished by the video processing technology such that the two or more processed videos include at least one impairment. The two or more processed videos are streamed to the target through a website, such that the two or more processed videos stream simultaneously to the target. Subjective feedback is received concerning a perceptional aspect of the two or more processed videos from the target through the website. A determination is made whether the video processing technology meets a criterion based on the subjective feedback received from the target.

In a third embodiment, a system is provided for evaluating at least two video processing technologies based on subjective feedback. The system includes a viewer, a database, and a server. The viewer is configured to display a first video and a second video simultaneously to a target. The database is configured to store the subjective feedback received from the target. The server is coupled to the viewer and the database. The server is capable of performing a method for evaluating at least two video processing technologies based on the subjective feedback. A first video and a second video is randomly selected from a plurality of video sources. At least one impairment is selected for each of the first and second videos, such that the first of the at least two video processing technologies conducts impairment processing of the first video, and the second of the at least two video processing technologies conducts impairment processing of the second video. The first and second videos are streamed simultaneously to the target through the viewer. Subjective feedback is received regarding the first and second videos from the target. A determination is made as to which of the at least two video processing technologies has a preferred video quality based on the subjective feedback received from the target.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Embodiments of the invention provide systems, computer readable media and methods for evaluating or assessing one or more video processing technologies based on subjective feedback. Randomly selected videos are processed with one or more video processing technologies such that the selected videos include at least one impairment. The randomly selected videos are streamed to targets, for the targets to provide subjective feedback regarding a perceptional aspect of the selected videos. Based on the subjective feedback received, one or more video processing technologies are assessed.

Throughout the description of the present invention, several acronyms and shorthand notations are used to aid the understanding of certain concepts pertaining to the associated system and services. These acronyms and shorthand notations are intended to provide an easy methodology of communicating the ideas expressed herein and are not meant to limit embodiments of the invention. The following is a list of these acronyms:

| IP | Internet Protocol |
| VPT | Video Processing Technology |
| WWW | World Wide Web |

Further, various technical terms are used throughout this description. An illustrative resource that fleshes out various aspects of these terms can be found in *Newton's Telecom Dictionary* by H. Newton, 24th Edition (2008).

Embodiments of the invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
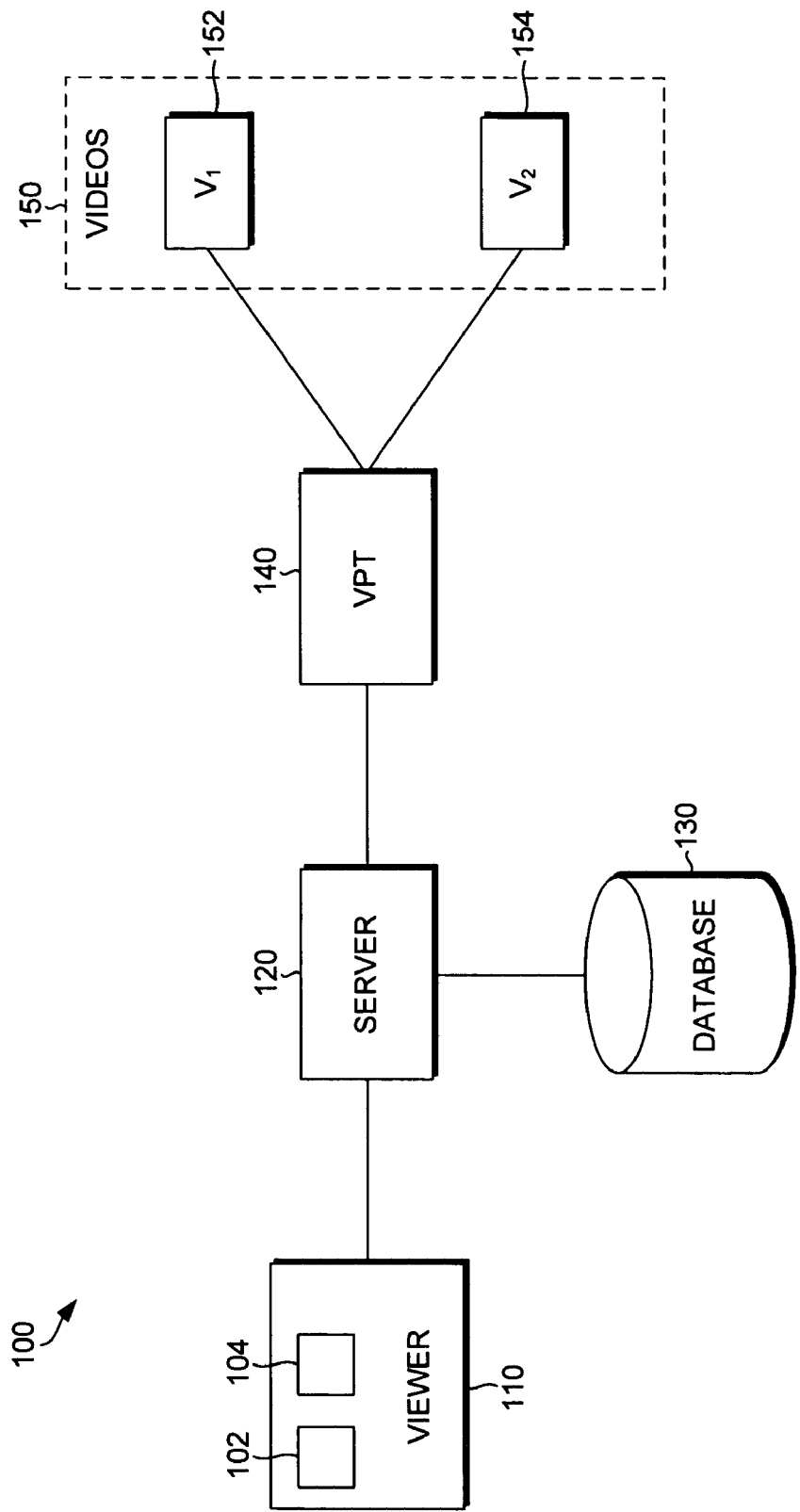
FIG. 1 depicts an exemplary networking environment for evaluating at least two video processing technologies based on subjective feedback according to embodiments of the invention.

FIG. 1 shows an exemplary networking environment for assessing a video processing technology based on subjective feedback. A system 100 includes a viewer 110, a server 120, and a database 130. The video processing technology that is to be assessed is configured to couple to the server 120. Further, the videos 150 which are processed by the video processing technology (VPT) 140 may include two or more videos, such as 152 and 154. The system 100 should not be construed to be limiting with regard to the embodiments of the invention, or exclusive to other elements of the system. The system 100 can include hundreds or thousands of additional elements and devices that are employed in concert with the devices shown. The system 100 shown in FIG. 1 is used to evaluate one or more video processing technologies based on subjective feedback received by one or more targets. In FIG. 1, the videos 152 and 154 are processed by the video processing technology 140 and then are transmitted to the server 120. The server 120 is coupled to the viewer 110 as well as a database 130. The server 120 is configured to perform a method for evaluating the VPT 140 based on subjective feedback. The server 120 randomly selects a first video 152 and a second video 154 from a plurality of video sources. The server 120 also selects at least one impairment for each of the first video 152 and the second video 154. After the VPT 140 has processed the first video 152 and the second video 154 such that the first and second videos include an impairment, the videos are then transmitted to the server 120. The server 120 then streams the processed videos 152 and 154 to the viewer 110. The viewer 110 is configured to display the first video 152 and the second video 154 simultaneously to a target. The viewer 110 includes a first video screen 102 and a second video screen 104. The video screens 102 and 104 are configured to display the first video 152 and the second video 154 respectively. One skilled in the art will appreciate that the viewer may contain any number of video screens. Video screens 102 and 104 of the viewer 110 ARE reserved for each of the videos 150 which are processed by the VPT 140 within the system 100. The database 130 is coupled to the server 120 and is configured to store the subjective feedback received from the one or more targets regarding the videos 150 that were processed by the VPT 140. The database stores the results of the subjective feedback and it may be coupled to a separate display (not shown), such that the subjective feedback may be displayed to a user of the system 100.

Figure 2:
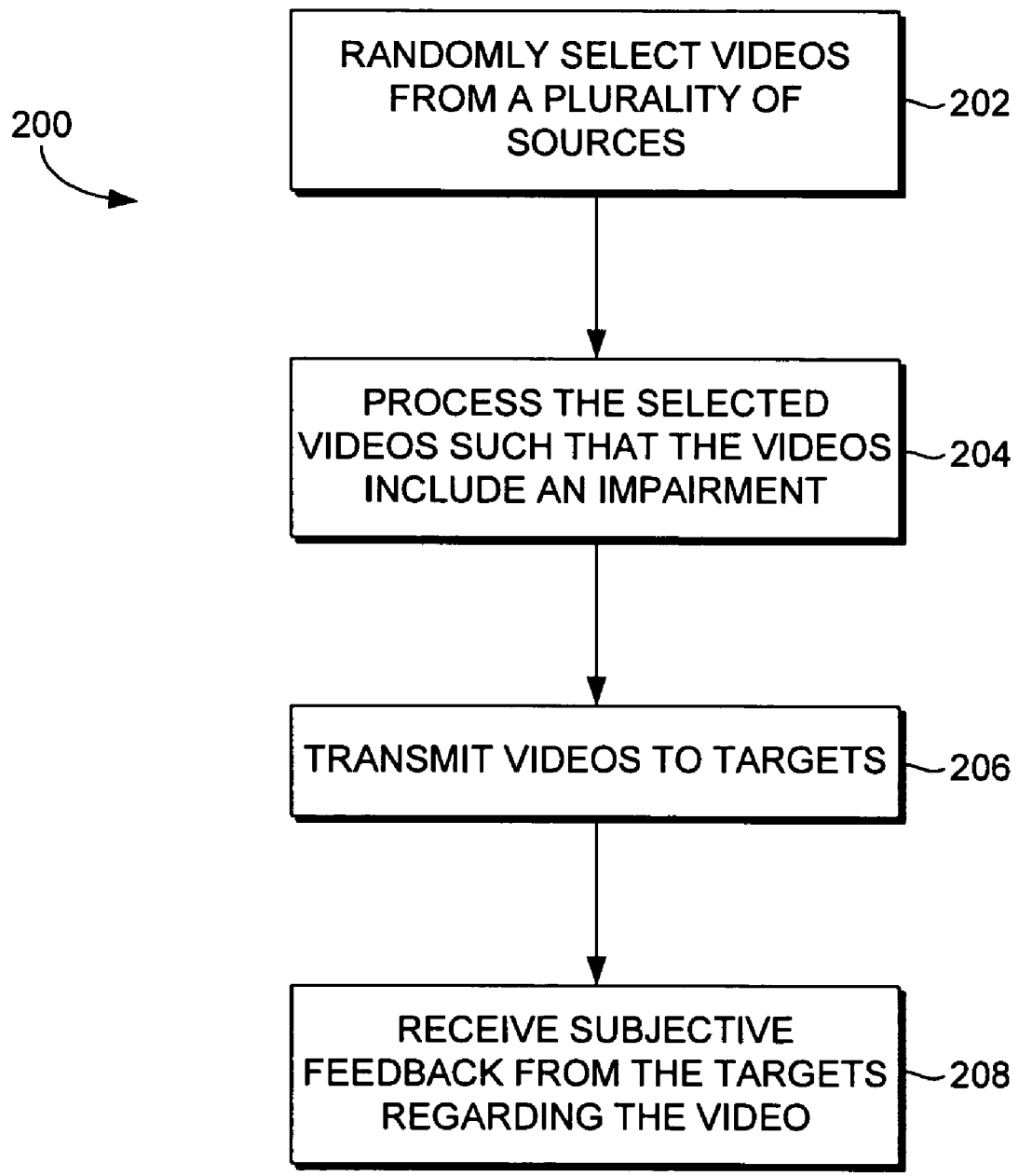
FIG. 2 is a flowchart showing a method for evaluating a video processing technology based on subjective feedback according to embodiments of the invention.

Turning now to FIG. 2, a method 200 for evaluating a video processing technology based on subjective feedback is shown. The method 200 includes a step 202 for randomly selecting videos from a plurality of sources for one or more subjective feedback targets. The selected videos may be one of stored videos, live videos, canned videos, stored video streams, live video streams, video chats, video clips, and any combination thereof. A step 204 is accomplished, during which the selected videos are processed such that the videos include at least one impairment. The processing of the selected videos is done by a video processing technology (VPT), such as a codec. In a step 206, the selected videos are transmitted to the one or more subjective feedback targets. At a step 208, subjective feedback is received from the one or more subjective feedback targets regarding a perceptional aspect of the selected videos. The perceptional aspect can include one of video quality, video distortion, video enhancement, video delay, video denigration, and any other aspect regarding the selected videos that can be perceived by a subjective feedback target. The impairment that is included with the selected videos following the processing of the videos by a video processing technology can be packet loss, jitter, latency, bandwidth, and any combination thereof.

The transmission of the selected videos to the one or more subjective feedback targets at step 206 is simultaneous. However, one skilled in the art can appreciate that the transmission of the selected videos at step 206 can be near simultaneous or in real time. As for the step 208, the receiving subject feedback from the one or more subjective feedback targets includes receiving user input from the one or more subjective feedback targets through a user interface or graphical user interface. One skilled in the art can appreciate that any type of user interface may be utilized to receive the user input from the one or more subjective feedback targets, including user interfaces that are coupled to a viewer or display.

In some embodiments, the method 200 includes determining a domain of subjective feedback targets. A domain of subjective feedback targets refers to any group of subjective feedback targets that have a common characteristic. For instance, one domain of subjective feedback targets can be hearing impaired individuals. Another domain is comprised of individuals having no hearing impaired difficulties. Yet a further domain of subjective feedback targets can be individuals who are known as "talking heads." A further domain of subjective feedback targets is known as "see you see me."

The differentiation of the domains of subjective feedback targets impacts what particular perceptional aspect of the videos can be tolerated by the subjective feedback targets. For instance, the hearing impaired domain is likely to handle black and white videos and require higher contrast and higher resolution with lower packet loss. This is because the domain of hearing impaired subjective feedback targets have different perceptional goals and perceptional requirements than that of the domain of talking heads. The domain of talking heads typically focus on video conferencing and therefore have different requirements, such as a lower frame loss, for the video quality of a particular VPT to be considered high. Likewise, the see you see me domain of subjective feedback targets require very high video quality because they are viewing for the entirety of the video scene, as opposed to focusing in on the lips of an individual being shown on a video clip.

The processing of the selected videos with a video processing technology in the step 204 can further include storing the selected videos having the impairment. The storing of the selected videos which include the impairment can be done in a database. The determining of a domain of subjective feedback targets can further include identifying at least one shared attribute of at least a portion of a pool of potential subjective feedback targets and selecting the subjective feedback targets from at least a portion of the pool of potential subjective feedback targets, based on the at least one shared attribute. In the case of the domain of the hearing impaired subjective feedback targets, the shared attribute would be that the targets have difficulty hearing or are deaf. Because the hearing impaired would concentrate on the signing for the deaf, obviously the hearing impaired domain of subjective feedback targets will have a different subjective feedback than that of a talking heads domain for the same clip.

Figure 3:
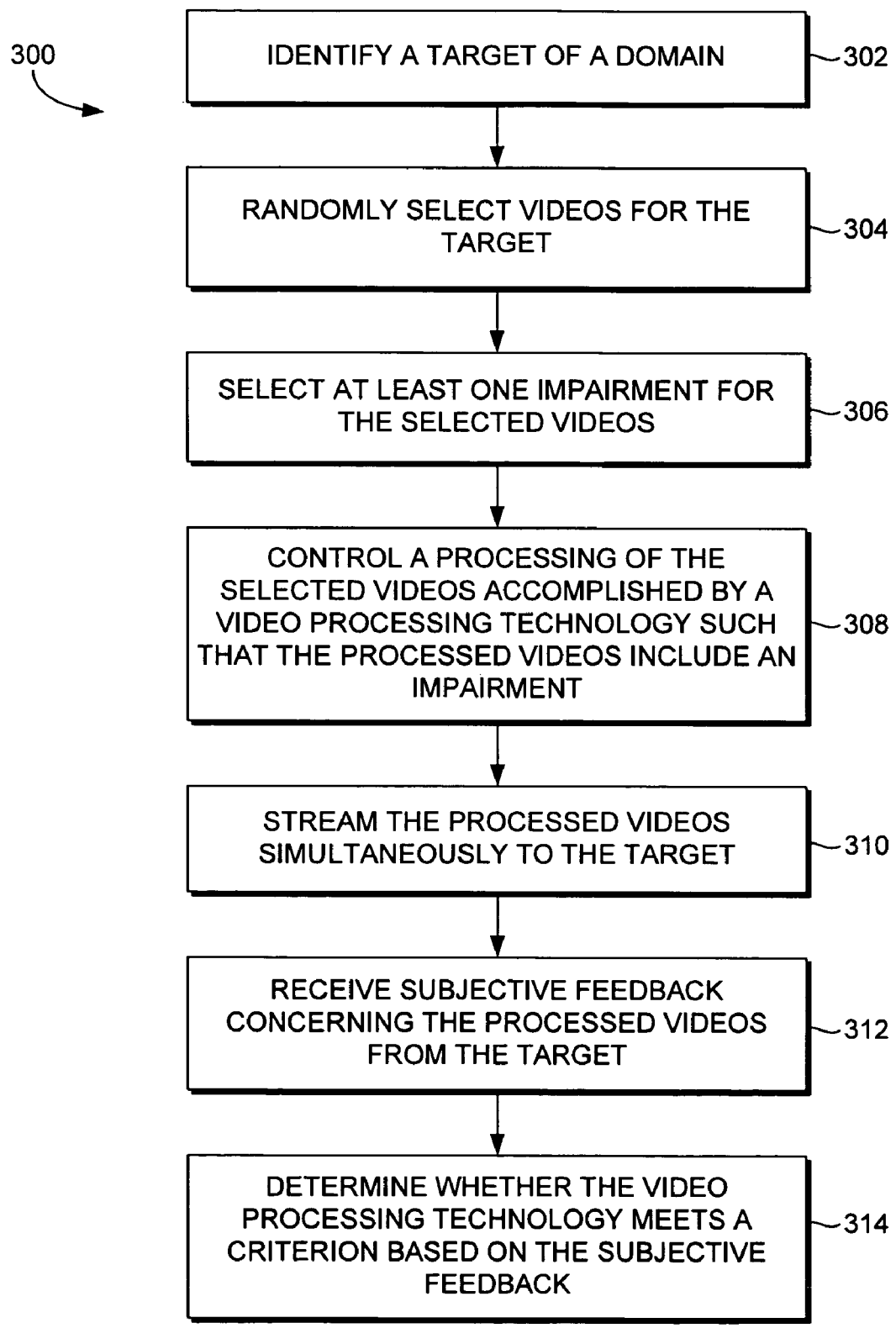
FIG. 3 is a flowchart showing a method for assessing a video processing technology based on subjective feedback according to embodiments of the invention.

Turning now to FIG. 3, a method 300 for assessing a video processing technology based on subjective feedback is given. At a step 302, a target of a domain is identified, based on a domain attribute. Such a domain attribute can be considered a shared attribute of two or more subjective feedback targets within a particular domain. The domain attribute can be any attribute that is shared by all the members of the domain. One skilled in the art can appreciate that the domain attribute does not need to be limited to a sensory deprivation or attribute of the domain, such as the attribute of being deaf for the hearing impaired domain. At a step 304, two or more videos are randomly selected from the plurality of video sources for the target. At a step 306, at least one impairment for the two or more videos is selected. The impairment can be at least one of packet loss, jitter, latency, bandwidth, and any combination thereof. At a step 308, a processing of the two or more videos is controlled. The processing is accomplished by the video processing technology such that the two or more processed videos include at least one impairment. The video processing technology is a codec, such as, but not limited to, Moving Pictures Experts Group or Society of Motion Picture and Television Engineers.

A step 310 allows for the streaming of the two or more processed videos to the target through a website. The streaming is such that the two or more processed videos are done simultaneously to the target. At a step 312, subjective feedback is received concerning a perceptional aspect of the two or more processed videos from the target through the website. Further, at a step 314, a determination is made whether the video processing technology meets a criterion based on the subjective feedback received from the target.

The perceptional aspect of the two or more processed videos can be one of video quality, video distortion, video enhancement, video delay, video denigration, and any aspect of a video that must be perceived by the subjective feedback target.

The method 300 in some embodiments includes generating an invitation to the website for the target, sending the invitation to the target, receiving an acceptance of the invitation from the target, and authorizing access to the website to the target to view videos through the website and provide subjective feedback to the website regarding the videos. One skilled in the art can appreciate that the invitation that is generated to the website for the target to accept can be placed in an e-mail, can be a token, can be an instant message, and can be in any other type of communication that may be received by the target. The sending of the invitation to the target may be done through IP, and any other means of electronic communication with the target. One skilled in the art can further appreciate that the authorization of the access to the website for the target to view videos through the website can be accomplished by any verification and/or authorization and methodology.

In some embodiments, the method 300 further includes the verification of the acceptance of the invitation from the target. The verification may include any type of verification of the identity of the target, whether the target is an appropriate target for a given domain, and can be also a verification of the invitation and the target matching up as it has been set forth within a particular database or server.

The subjective feedback that is received by the targets includes an assessment as to which of the two or more videos includes an optimal video quality. One skilled in the art can appreciate that the determination or the assessment as to which of the two or more videos includes an optimal video quality is where the subjective feedback feature of embodiments of the invention. In other words, based on the domain of the feedback target, the assessment can differ. As explained previously, the domain of the hearing impaired targets will require a different set of requirements for a judgment of an optimal video quality than that of a domain having talking heads.

Figure 4:
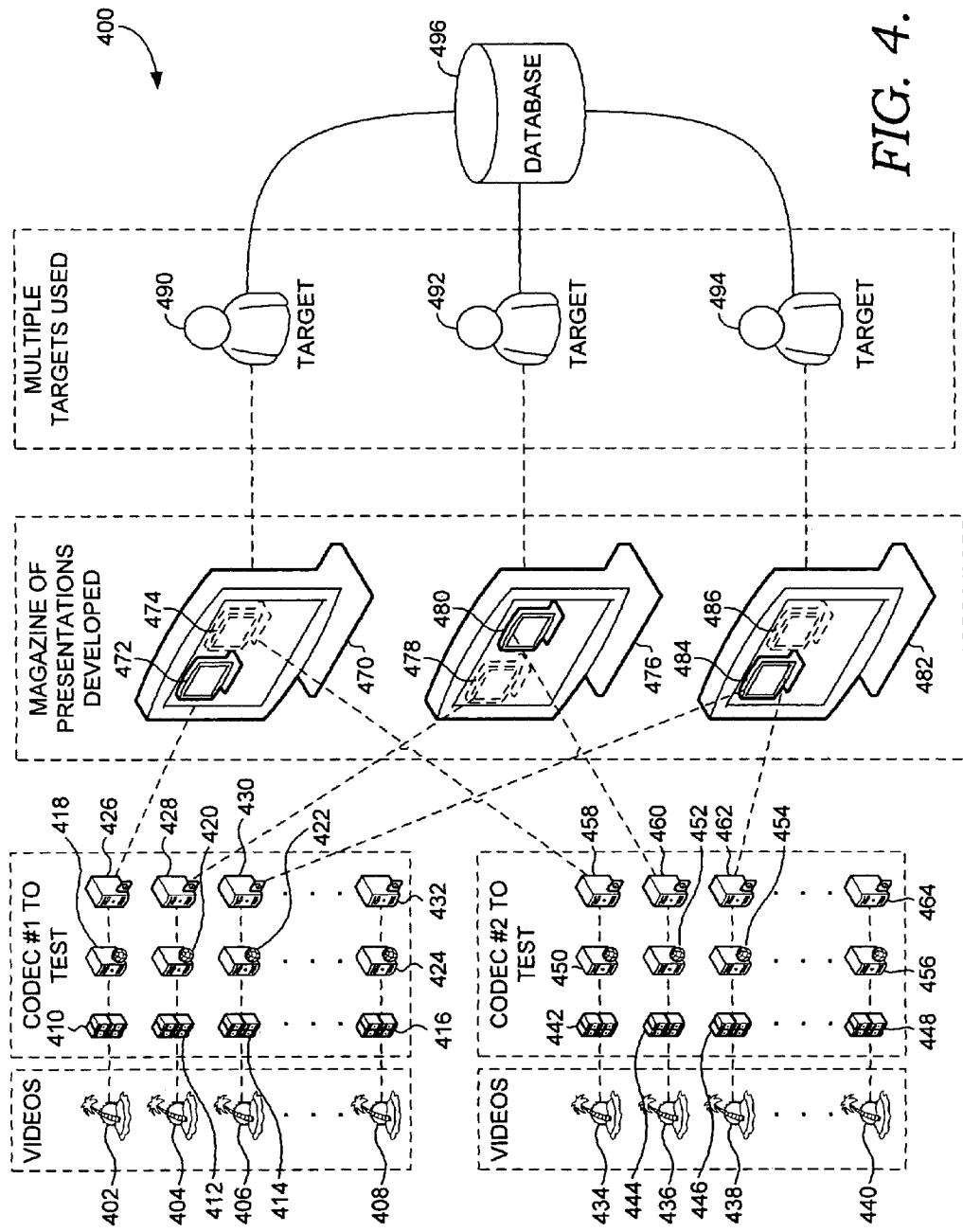
FIG. 4 depicts an exemplary networking environment for evaluating at least two video processing technologies according to embodiments of the invention.

There are shown in FIG. 4 two sets of videos. The first set of videos, 402, 404, 406, and 408, are to be processed by codec number one, which can be considered as a first video processing technology. A second set of videos is to be processed by a codec number two, which can also be referred to as the second video processing technology. Those videos are shown as videos 434, 436, 438, and 440. Codecs number one and two all include a server, an impairment device, and an impaired video capture. For instance, video 402 is shown as being transmitted through a server 410 and then processed utilizing an impairment device 418, followed by a capture of the impaired video at 426. The servers are shown as 410, 412, 414, and 416 for codec number one. The impairment devices are shown as 418, 420, 422, and 424 for codec number one. And the capturing of the impaired videos are shown at 426, 428, 430, and 432 for codec number one. However, it will be appreciated by one skilled in the art that although codec number one shows multiple servers and multiple impairment devices and the capturing mechanism of capturing of impaired videos utilizing different devices, one or more components of the first video processing technology (codec number one) can be utilized. In other words, multiple components are not necessarily required for a first video processing technology. The codec number one in FIG. 4 is exemplary only. Likewise, for video 434, which is a video for a codec number two (second video processing technology), a server is shown as 442. An impairment device for that same video 434 is shown as 450 and the capturing of the impaired video is shown at 458. The servers are shown as 442, 444, 446, and 448. However, the same server can be utilized for all videos 434, 436, 438, and 440. Embodiments of the invention do not require a particular number of servers, or a particular number of impairment devices within a particular codec. Likewise, impairment devices 450, 452, 454, and 456 are shown to be those for videos 434, 436, 438, and 440, respectively. However, this too is exemplary. Also, the capturing of the impaired video is shown at 458, 460, 462, and 464 for videos 434, 436, 438, and 440 respectively. This too is exemplary.

Still referring to FIG. 4, the system 400 includes a viewer configured to display a first video and a second video simultaneously to a target. The target can be one or more individual associated with viewing devices. In FIG. 4, the targets are shown as 490, 492, and 494. The viewer is a display for a target. For instance, for the viewer 470, there are two video screens 472 and 474 to display a first video and a second video. According to FIG. 4, the first video screen 472 is to display the video captured from codec number one at the capture part of 426. Likewise, for the same viewer 470, a second video that has been impaired and captured at 458 is shown in a second screen 474. As stated previously, the first video and the second video are to be shown simultaneously to a target on the same viewer. FIG. 4 shows multiple viewers 470, 476, and 482 for multiple targets 490, 492, and 494, respectively. The figure also shows that the target 490 has selected the second video that was displayed in the video screen 474 because the second video screen 474 is in dotted outline. This shows that the target has selected the second video over the first video, where the second video is shown in the second video screen 474 and the first video is shown in the first video screen 472, both video screens being displayed simultaneously on the viewer 470 for the target 490.

The system 400 further includes a database (not shown) which is configured to store subjective feedback received from the targets. In this case, the database is configured to receive the subjective feedback from the targets 490, 492, and 494. One skilled in the art can appreciate that any number of targets may be utilized to receive subjective feedback. However, embodiments of the invention may utilize multiple test targets to obtain the highest number of subjective feedback at a given time.

The system 400 further includes a server coupled to a viewer and a database. For instance, the server 410 is coupled to the viewer 470 and the database 496. Such a server is capable of performing a method for evaluating at least two video processing technologies based on subjective feedback. In other words, the server randomly selects a first and a second video from a plurality of video sources. Once it has randomly selected the videos, the server 410 further selects an impairment for each of the first and second videos such that the first of the at least two video processing technologies conducts impairment processing of the first video. Also, the second of the at least two video processing technologies conducts impairment processing of the second video. The first and second videos are then streamed simultaneously to the target through the viewer. In this case, the video from 402 that was processed by codec number one is streamed in the first video screen 472 of the viewer 470. Further, the server 400 receives the subjective feedback concerning the first and second videos from the target. Once the server 400 has received the subjective feedback, it then determines which of the at least two video processing technologies has a preferred video quality based on the subjective feedback received from the target.

It should be noted that the use of multiple video screens on a viewer allows for subjective feedback targets to make a comparative analysis or determination of which of the videos shown on the video screens can have an optimal video quality or a preferred video quality in comparison with each other. Traditionally, objective testing only allowed for video streams to be based on quantitative measurements such as VMOSS scores and signal-to-noise ratios with no user input. Subjective testing, however, allows for a less time-consuming qualitative scoring with an interactive measurement of a perceptional aspect of the video quality that is usually not captured by quantitative measurements alone. Furthermore, embodiments of the invention allow different codecs to be tested utilizing different applications, different impairments, and different methodologies for a particular target audience such as a domain. In other words, the invention is quicker, it allows for more targets or test subjects to be tested, the use of multiple screens allows for more clips to be shown to a target simultaneously, and different groups of people can be tested with an infinite array of different impairments for the particular video clips. Embodiments of the invention may utilize wireless connections, and the subjective feedback targets view video screens simultaneously on a display.

In an embodiment, a website display clips for 10 to 15 second timed intervals to a subjective feedback target simultaneously in one display. It can be appreciated that the system may also include an enrollment system for the subjective feedback targets who then receive an e-mail from the enrollment system with a link to the website.

The system can further include a display unit for plotting distribution on a quality curve versus network impairment. Such a plot distribution can be automated for ease of use.

In another embodiment, the videos are randomly selected. By the randomness of the video selection, this hopefully will eliminate the difficulties that arise when subjective feedback targets become tired and therefore provide less accurate subjective feedback because they see the same video clips over and over.

The videos are shown in real time utilizing a media maker. This allows for an automated website to provide the evaluation methodology of utilizing subjective feedback and it is therefore differs from quantitative measurements based on objective scores such as VMOSS. A subjective feedback target selects which of the video clips shows an optimal video quality by clicking on a mouse coupled to the viewer to select the preferred video clip. As technology improves, the perception of particular domains of subjective feedback targets may change over time. For instance, as technology improves and as people become more technologically savvy, it may be that one particular domain of subjective feedback targets may modify their requirements of video quality over time. Embodiments of the invention address those types of modifications and can therefore judge which of the video processing technologies is best suited for a particular domain of subjective feedback targets.

One skilled in the art can further appreciate that the impairment for a particular video can be inserted at real time. In other words, it can be changed on the fly and you can even perhaps take out the impairment at some given time. Embodiments of the invention allow for such modifications. Many different arrangements of the various components depicted, as well as components not shown, are possible without departing from the spirit and scope of the present invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for evaluating a video processing technology based on subjective feedback, comprising:
    receiving a request to view videos and provide feedback from one or more subjective feedback targets;

randomly selecting at least two videos from a plurality of sources for one or more subjective feedback targets;

processing the at least two selected videos with a video processing technology, such that the at least two selected videos include at least one impairment;

transmitting the at least two selected videos to a viewer that simultaneously displays the at least two selected videos to the one or more subjective feedback targets; and receiving subjective feedback from the one or more subjective feedback targets regarding a perceptional aspect of the at least two selected videos.

2. The method of claim 1, wherein the video technology is a codec.

3. The method of claim 1, wherein the perceptional aspect comprises one of video quality, video distortion, video enhancement, video delay and video denigration.

4. The method of claim 1, wherein the impairment is one of packet loss, jitter, latency, bandwidth, and any combination thereof.

5. The method of claim 1, wherein receiving subjective feedback from the from the one or more subjective feedback targets comprises receiving user inputs from the one or more subjective feedback targets through a user interface.

6. The method of claim 1, wherein the at least two selected videos are one of stored videos, live videos, canned videos, stored video streams, live video streams, video chats, video clips, and any combination thereof.

7. The method of claim 1, wherein transmitting the at least two selected videos to the one or more subjective feedback targets is one of simultaneous, near-simultaneous and real-time.

8. The method of claim 1, further comprising:
storing subjective feedback received from the one or more subjective feedback targets regarding the at least two selected videos; and
displaying the subjective feedback on a display.

9. The method of claim 1, wherein processing the at least two selected videos with a video processing technology, such that the at least two selected videos include at least one impairment further comprises storing the at least two selected videos having the impairment.

10. The method of claim 1, further comprising determining a domain of subjective feedback targets.

11. The method of claim 10, wherein determining a domain of subjective feedback targets comprises:
identifying at least one shared attribute of at least a portion of a pool of potential subjective feedback targets; and
selecting subjective feedback targets from the at least a portion of the pool of potential subjective feedback targets, based on the at least one shared attribute.

12. A non-transitory computer readable medium having computer-executable instructions embodied thereon for causing a network element to perform a method for assessing a video processing technology based on subjective feedback, the method comprising the steps of:
receiving a request to view videos and provide feedback from a target;
identifying the target of a domain, based on a domain attribute;
randomly selecting two or more videos from a plurality of video sources for the target;
selecting at least one impairment for the two or more videos;

controlling a processing of the two or more videos, the processing being accomplished by the video processing technology such that the two or more processed videos include at least one impairment;

streaming the two or more processed videos to the target through a website, such that the two or more processed videos stream simultaneously to the target;

receiving subjective feedback concerning a perceptional aspect of the two or more processed videos from the target through the website; and determining whether the video processing technology meets a criterion based on the subjective feedback received from the target.

13. The computer readable medium of claim 12, the method further comprising:
generating an invitation to the website for the target;
sending the invitation to the target;
receiving an acceptance of the invitation from the target; and
authorizing access to the website to the target to view videos through the website and provide subjective feedback to the website regarding the videos.

14. The computer readable medium of claim 13, the method further comprising verifying the acceptance of the invitation from the target.

15. The computer readable medium of claim 12, wherein the video processing technology is a codec.

16. The computer readable medium of claim 12, wherein the impairment is at least one of packet loss, jitter, latency, bandwidth, and any combination thereof.

17. The computer readable medium of claim 12, wherein the perceptional aspect is one of video quality, video distortion, video enhancement, video delay and video denigration.

18. The computer readable medium of claim 12, wherein the subjective feedback comprises an assessment as to which of the two or more videos includes an optimal video quality.

19. A system for evaluating at least two video processing technologies based on subjective feedback, comprising:
a viewer configured to display a first video and a second video simultaneously to a target, authorize reception of the first videos and second video, and provide feedback from one the first videos and second video;
a database configured to store the subjective feedback received from the target; and
a server coupled to the viewer and the database, the server capable of performing a method for evaluating at least two video processing technologies based on the subjective feedback, the method comprising:
randomly selecting a first video and a second video from a plurality of video sources;
selecting at least one impairment for each of the first and second videos, such that the first of the at least two video processing technologies conducts impairment processing of the first video, and the second of the at least two video processing technologies conducts impairment processing of the second video;
streaming simultaneously the first and second videos to the target through the viewer;
receiving the subjective feedback regarding the first and second videos from the target; and
determining which of the at least two video processing technologies has a preferred video quality based on the subjective feedback received from the target.

* * * * *